(12) United States Patent
McLellan et al.

(10) Patent No.: US 8,011,872 B2
(45) Date of Patent: Sep. 6, 2011

(54) LOADER FRAME ASSEMBLY

(76) Inventors: Jeffery S. McLellan, Canton, CT (US); Robert J. Wagner, Trumbull, CT (US)

( * ) Notice: Subject to any disclaimer, the term of this patent is extended or adjusted under 35 U.S.C. 154(b) by 1631 days.

(21) Appl. No.: 11/196,652

(22) Filed: Aug. 2, 2005

(65) Prior Publication Data

US 2006/0104777 A1    May 18, 2006

Related U.S. Application Data

(60) Provisional application No. 60/598,024, filed on Aug. 2, 2004.

(51) Int. Cl.
*B65F 3/00* (2006.01)
(52) U.S. Cl. .................................................... 414/555
(58) Field of Classification Search ............. 414/543, 414/544, 546, 555
See application file for complete search history.

(56) References Cited

U.S. PATENT DOCUMENTS

| | | | | |
|---|---|---|---|---|
| 358,558 A * | 3/1887 | Lathrop | ............... | 414/543 |
| 3,082,889 A * | 3/1963 | Bopp | ............... | 414/543 |
| 3,494,489 A * | 2/1970 | Kruger | ............... | 414/543 |
| 3,874,526 A * | 4/1975 | Lambert | ............... | 414/462 |
| 3,918,742 A * | 11/1975 | Gaibler et al. | ............... | 280/764.1 |
| 4,091,943 A * | 5/1978 | Bay-Schmith | ............... | 414/812 |
| 4,111,316 A * | 9/1978 | Wappler | ............... | 414/550 |
| 4,496,166 A * | 1/1985 | Anderson | ............... | 280/401 |
| 4,659,276 A * | 4/1987 | Billett | ............... | 414/543 |
| 5,490,753 A * | 2/1996 | Green | ............... | 414/498 |
| 6,276,888 B1 * | 8/2001 | Rubio | ............... | 414/406 |

* cited by examiner

*Primary Examiner* — Joshua I Rudawitz
(74) *Attorney, Agent, or Firm* — McCormick, Paulding & Huber LLP

(57) ABSTRACT

A loader frame assembly is provided which comprises a support member adapted to mount a loader thereto and first and second legs each having first and second ends. The first ends are connected to the support member and the second ends are adapted for connection to a vehicle. The legs are spaced apart such that they partially define an open area such that a load can extend through the loader frame assembly. The frame assembly adapted for a rear-mounted loader vehicle, in cooperation with a rotatably mounted loader, can encompass a work area that includes the vehicle bed, the area adjacent to each side of the vehicle bed, and the area behind the vehicle bed. Due to the open area, the loader frame assembly also can work in cooperation with vehicle configurations including vehicles equipped with pushing and dumping functionality, closed compartments, and towed devices.

10 Claims, 11 Drawing Sheets

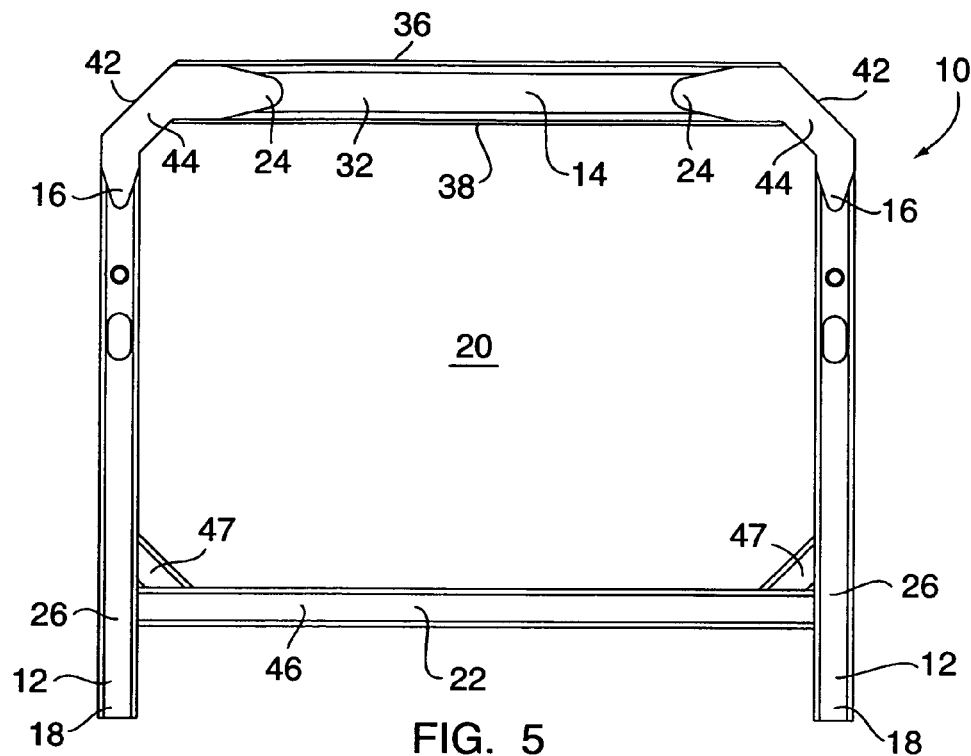
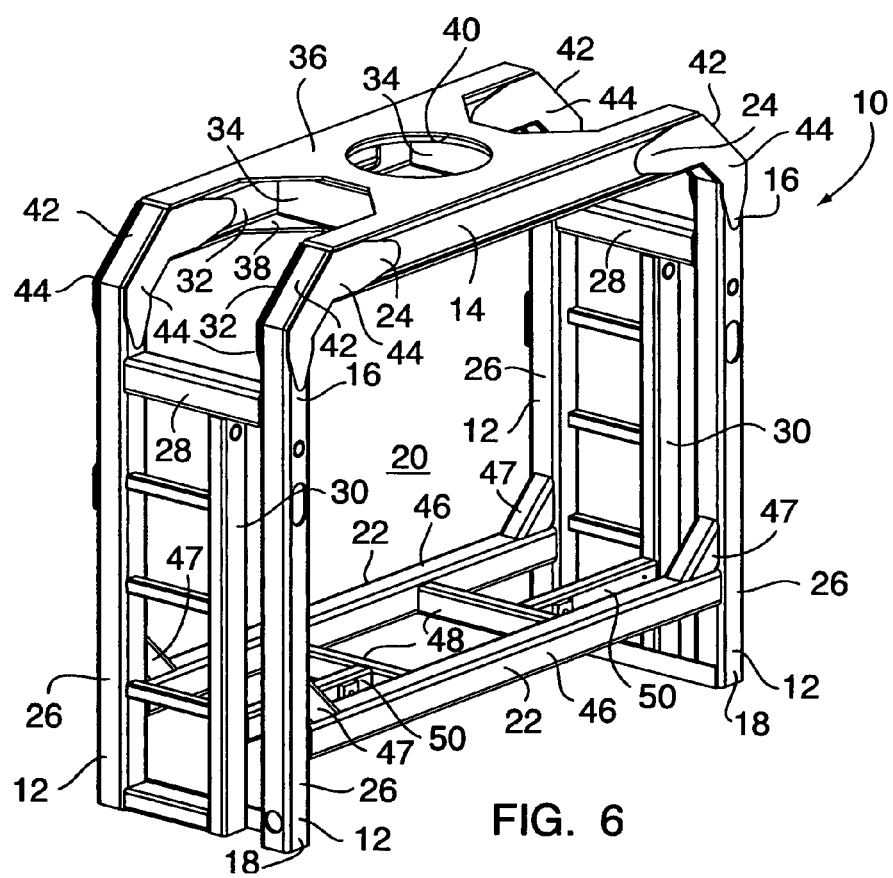

LOADER FRAME ASSEMBLY

CROSS REFERENCE TO RELATED APPLICATIONS

The present application claims priority to, and hereby incorporates by reference in its entirety, U.S. Provisional Application No. 60/598,024 filed on Aug. 2, 2004.

TECHNICAL FIELD

The present invention is directed to loader vehicles, generally, and particularly to loader and loader frame assemblies adaptable for connection to such vehicles. The benefits of the present invention, while generally applicable, are particularly pertinent to self-loading log trucks.

BACKGROUND

Self-loading log trucks have traditionally had the loading apparatus mounted directly behind the cab of the truck. FIG. 1 show a typical cab-mounted loader arrangement. Cab-mounted loader 180 has a loader 160 mounted behind the cab on a mounting apparatus 110. While this design allows for logs 184 to be loaded such that the logs overhang the back of the truck bed 182, the work area 170 is limited to the sides of truck bed 182. The loader 160 physically cannot reach behind truck bed 182 and cannot reach over the cab out of safety considerations.

Rear-mounted loaders 280 have recently become more popular. With the loader mounting apparatus 210 moved to the rear of truck bed 282, loader 260 work area 270 is enlarged. However, to accommodate the same typical two-tiered log load 284, truck bed 282 must be significantly longer than truck bed 182. With a longer truck bed 282, loader mounting apparatus 210 is placed further behind rear axles 285. A greater portion of the total weight of the rear-mounted loader 280 is then placed on the rear axles. This poor weight distribution increases wear and tear on the suspension and adversely impacts overall truck handling, effectively limiting the maximum safe payload.

It can be seen, therefore, that there is a need for a loader vehicle design that has the payload capacity advantages of a cab-mounted loader while still possessing the increased work area of a rear-mounted loader.

SUMMARY

A loader frame assembly is provided that includes a support member adapted to mount a loader thereto and first and second legs each having first and second ends, the first ends being connected to the support member and the second ends being connected to a vehicle, such that the first and second legs partially define an open area allowing a load (of logs, for instance) to be passed through the loader frame assembly.

Since the load extends through the loader frame assembly, the loader frame assembly connected to a loader vehicle allows a rotatably mounted loader on the loader vehicle to encompass the working area of a conventional rear-mounted loader, while still accommodating a standard payload on a shorter vehicle bed.

It can be seen that such a loader frame assembly allows a loader vehicle to provide the working area benefits of a rear-mounted loader without the adverse suspension, handling, and payload drawbacks. Additionally, such a loader frame assembly would allow for greater configuration flexibility by operatively functioning with loader vehicle configurations not effective with conventional loaders, including configurations with one or more of pushing functionality, dumping functionality, and towed chippers.

The scope of the present invention will be more fully appreciated in light of the drawings and the detailed descriptions of embodiments that follow.

DESCRIPTION OF THE DRAWINGS

FIG. 5 shows a rear view of a loader frame assembly according to an embodiment of the present invention.

FIG. 6 shows a perspective view of a loader frame assembly according to an embodiment of the present invention.

DETAILED DESCRIPTION

Figure 3:
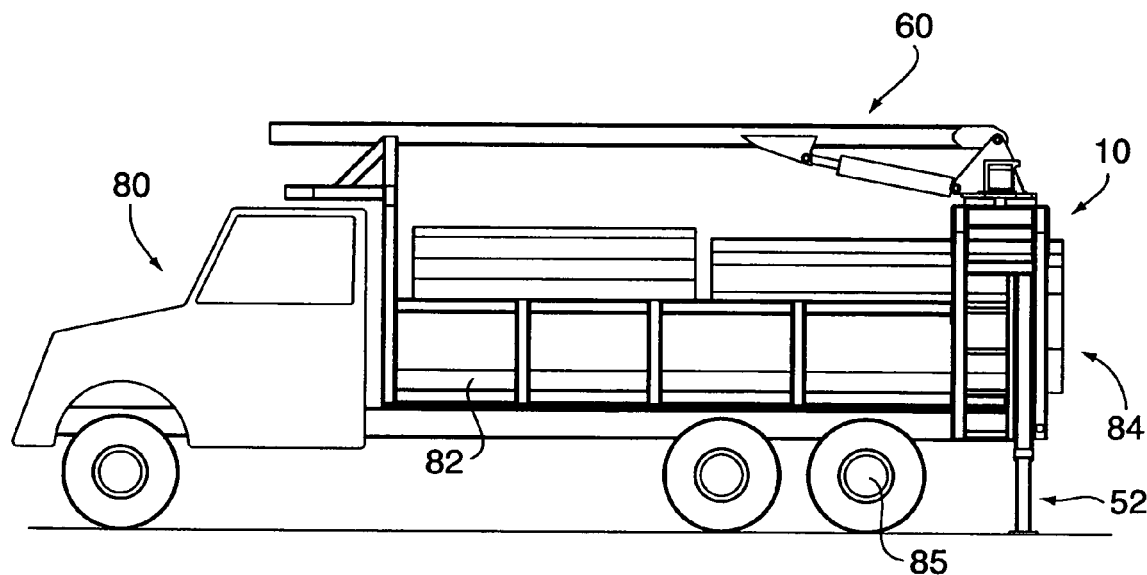
FIG. 3 shows a side view of a loader vehicle equipped with a loader frame assembly according to an embodiment of the present invention.
Figure 4:
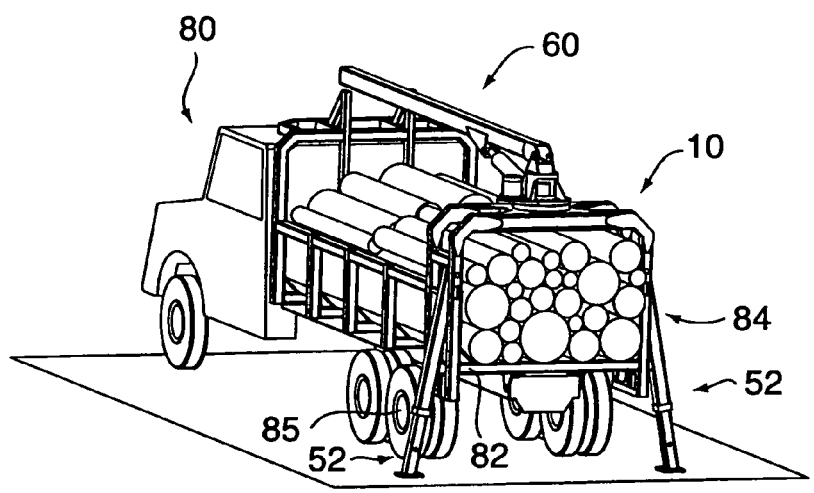
FIG. 4 shows a perspective view of loader vehicle equipped with a loader frame assembly according to an embodiment of the present invention.

Referring to FIGS. 3 and 4, a loader frame assembly 10 is shown, according to a preferred embodiment of the present invention, connected to loader vehicle 80 (preferably a self-loading log truck), and preferably connected to a rear portion of vehicle bed 82. A load 84, preferably logs, is carried on vehicle bed 82 and extends through loader frame assembly 10. A loader 60 is mounted to loader frame assembly 10.

FIGS. 5 and 6 show an embodiment of loader frame assembly 10 according to the present invention. Loader frame assembly 10 is provided with legs 12 and support member 14. Legs 12 have a first ends 16 and second ends 18. Leg first ends 16 are preferably connected to support member 14 at support member ends 24. Leg second ends 18 are adapted for connection to a vehicle, preferably for connection to a vehicle bed. Legs 12 are spaced apart so as to partially define open area 20. In the embodiment shown, support member 14 further defines open area 20. Base member 22 is also shown further defining open area 20. Base member 22 is, for example, integral with a vehicle bed, or base member 22 is a separate member that is adapted for connection to a vehicle together with leg second ends 18.

Each leg 12 is preferably constructed of two leg posts 26. For greater strength and rigidity, leg strut 28 is connected between leg posts 26. To facilitate access to support member 14, a ladder 30 is preferably incorporated into a leg 12, preferably attached to a leg post 26 and terminating at a leg strut 28.

Support member 14 is preferably constructed with support beams 32. Support struts 34 are connected between support beams 32. Lower support plate 38 is attached below support beams 32 and support struts 34 and upper support plate 36 is attached above support beams 32 and support struts 34. At least upper support plate 36 is provided with a mounting hole 40. Mounting hole 40 is preferably located in the area formed between support beams 32 and support struts 34, and adapted to rotatably mount a loader thereto.

Leg posts 26 and support beams 32 are directly connected or preferably joined by connections to opposing ends of angle joints 42. These connections are preferably reinforced by means of angle side plates 44 attached to outer and inner sides of angle joint 42. This connection of leg posts 26 and support beams 32 via angle joints 42 allows for a better transmission of force from support member 14 to legs 12.

Base member 22 is preferably provided with base beams 46 connected between leg posts 26. The connection of base beams 46 and leg posts 26 is preferably reinforced using a corner joint 47 at each connection. Base struts 48 are connected between base beams 46 for additional strength and rigidity. A ladder strut 50 is preferably provided between a base strut 48 and a ladder 30.

The posts, beams, struts and joints of loader frame assembly 10 are preferably fabricated from metal, most preferably steel, and preferably formed as hollow internally vice solid. Connections can be made using any of several connection methods well known in the art, but bolting and welding are more preferred.

Figure 1A:
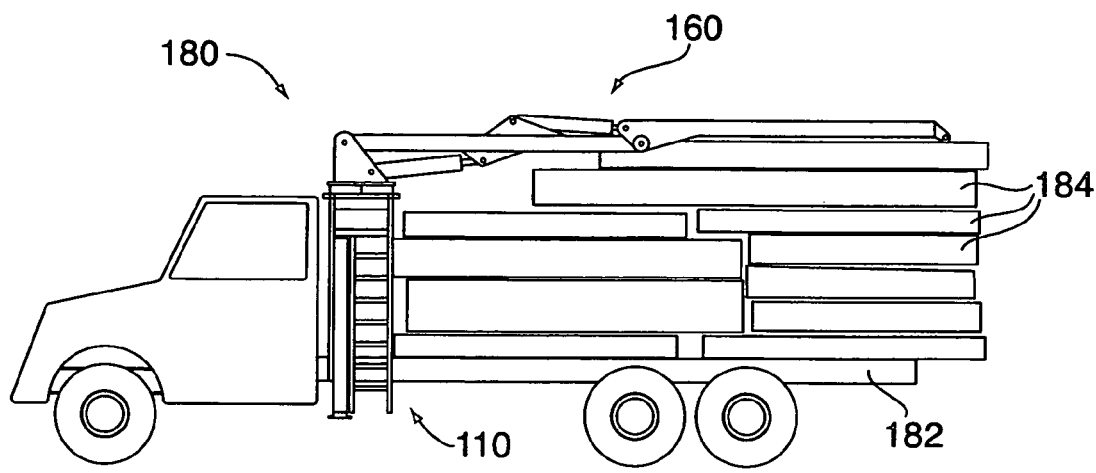
FIG. 1A shows a side view of a conventional cab-mounted loader.
Figure 1B:
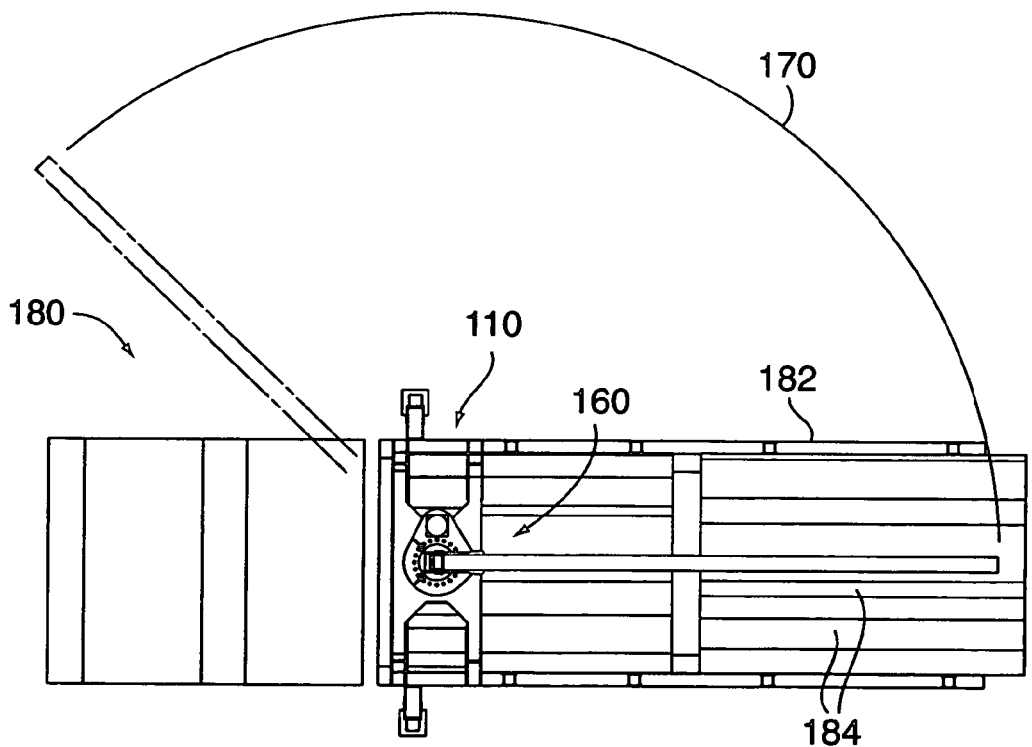
FIG. 1B shows a top view of a conventional cab-mounted loader.
Figures 2A, 2B:
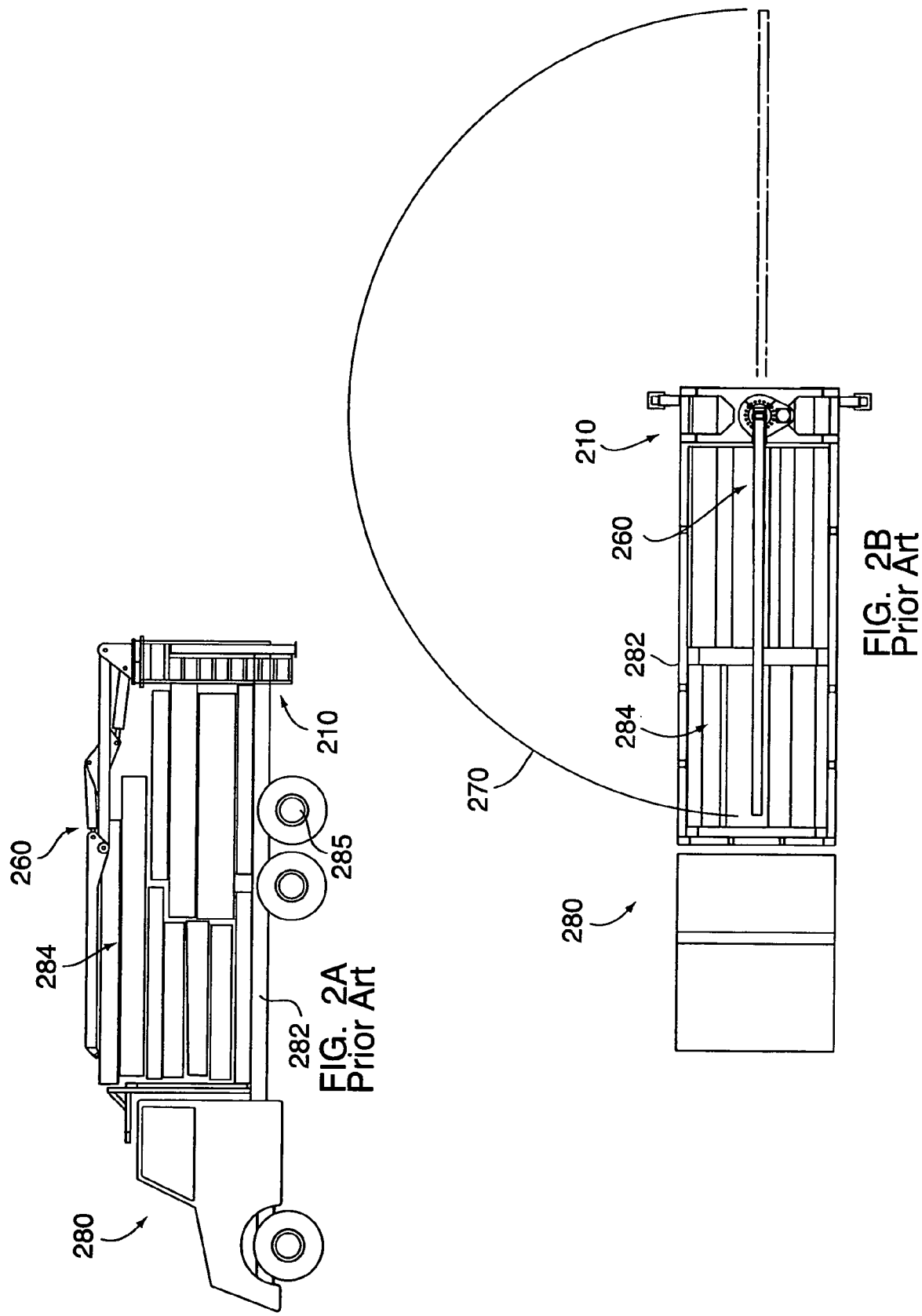
FIG. 2A shows a side view of a conventional rear-mounted loader.
FIG. 2B shows a top view of a conventional rear-mounted loader.

It can be appreciated from the embodiments described above, that a loader vehicle 80 (as in FIG. 3) equipped with loader frame assembly 10, enjoys superior payload capacity compared to conventional rear mounted loader 280 (FIG. 2) with using a shorter bed. Since load 84 extends through loader frame assembly 10, load 84 can extend past the end of vehicle bed 82, and loader frame assembly can be mounted closer to rear axle 85. In conventional rear-mounted loader 280, load 284 could not extend through loader apparatus 210, requiring a longer bed 282 and a greater distance between loader apparatus 210 and rear axle 285.

Figure 7:
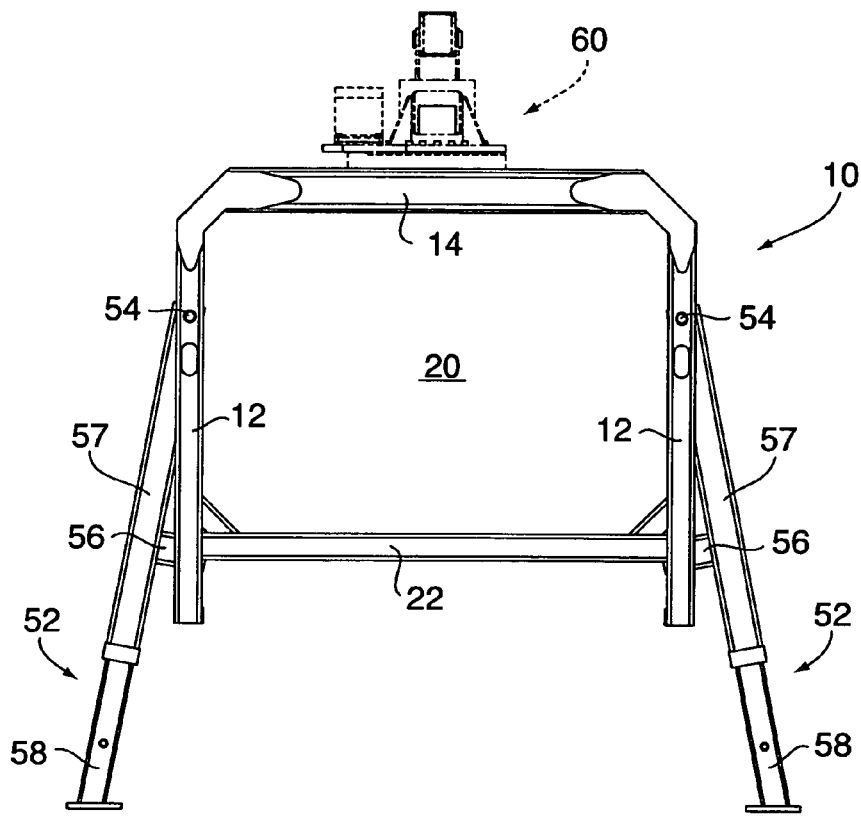
FIG. 7 shows a rear view of a loader frame assembly according to an embodiment of the present invention.

Referring to FIG. 7, a preferred embodiment according to the present invention can be seen. In this embodiment, loader frame assembly 10 (shown with loader 60, in broken lines, rotatably mounted to support member 14) is provided with extendable stabilizers 52.

Extendable stabilizers 52, provided with upper portions 57 and retractable portions 58, are preferably rotatably mounted to legs 12 via stabilizer pivots 54 and stabilizer struts 56. Stabilizer struts 56 are slidably attached between legs 12 and extendable stabilizers 52 such that extendable stabilizers 52 can transition between a position outwardly rotated from legs 12 and a position inwardly rotated toward legs 12, and maintained in either position.

Figure 8:
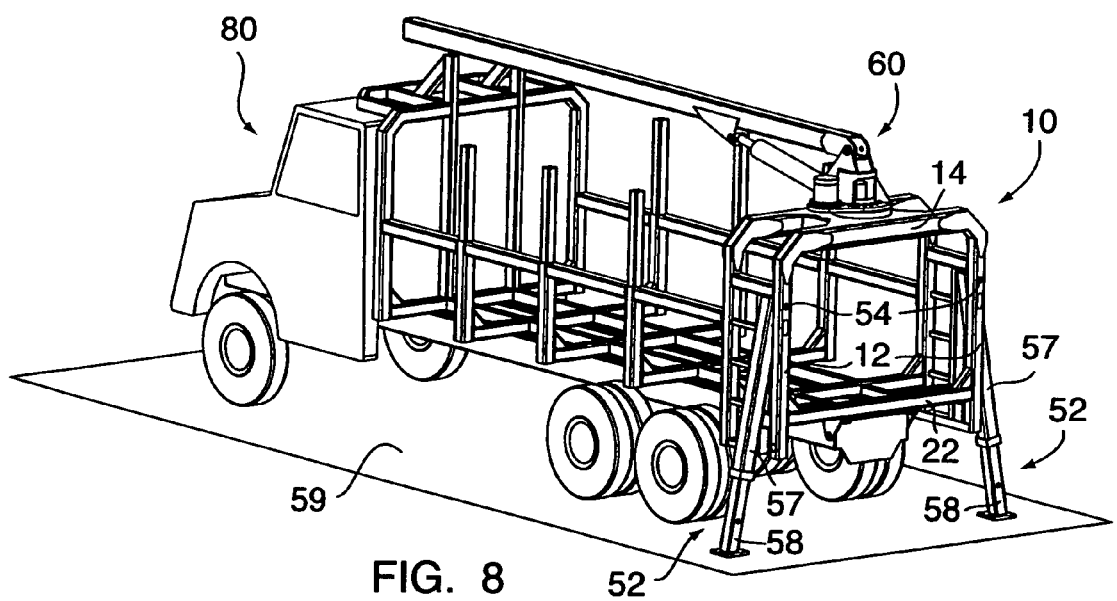
FIGS. 8-10 show perspective views of a loader vehicle equipped with a loader frame assembly according to an embodiment of the present invention.

Referring to FIG. 8, a vehicle 80 equipped with loader frame assembly 10 provided with extendable stabilizers 52 is shown in perspective. Extendable stabilizers 52 are shown in an outwardly rotated position, with retractable portions 58 extended from upper portions 57 so as to engage support surface 59. It can be appreciated in the embodiment shown in FIG. 8 that extendable stabilizers 52 widen the effective footprint of vehicle 80. This increased effective footprint provides vehicle 80 with greater stability during a loading process.

Figure 9:
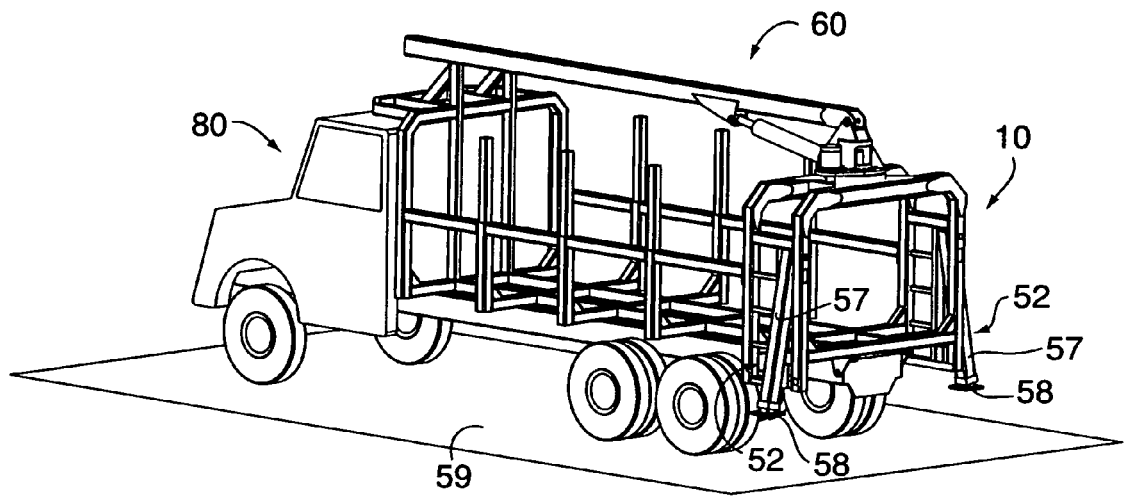
Figure 10:
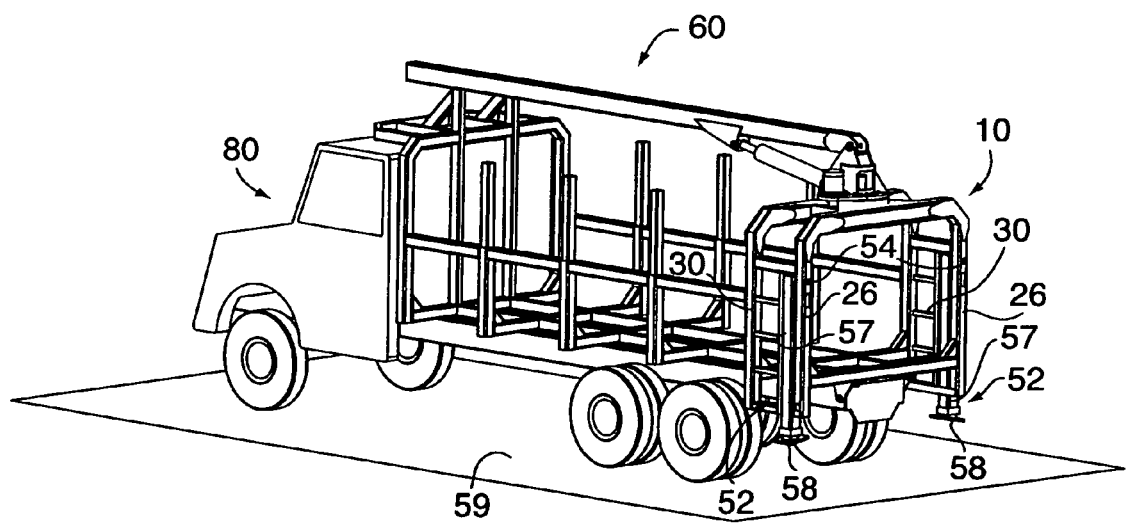

Referring to FIG. 9, extendable stabilizers 52 can be seen with retractable portions 58 retracted within upper portions 57 such that support surface 59 is no longer engaged. In FIG. 10, extendable stabilizers 52 are shown in an inwardly rotated position with retractable portion 58 retracted. It can be seen that, in this embodiment, each extendable stabilizer 52 fits neatly between a ladder 30 and a leg post 26. This is the preferred position for extendable stabilizers 52 when repositioning vehicle 80.

Also shown in FIG. 10, loader frame assembly 10 is equipped with loader 60 according to a preferred embodiment of the present invention. Loader 60 is provided with a rotatable mount 62. Rotatable mount 62 is mounted, preferably bolted, to support member 14.

Figure 15:
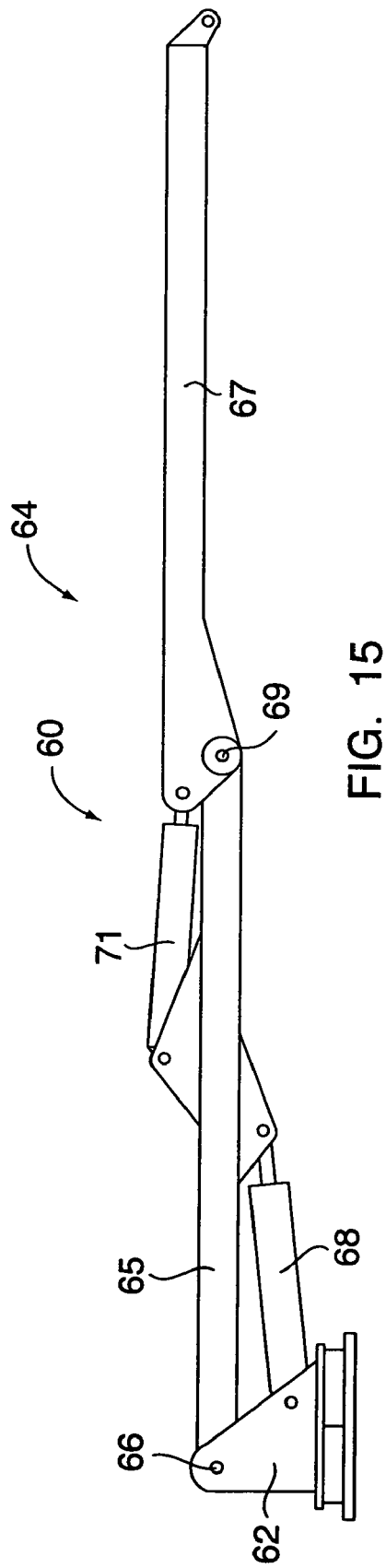
FIG. 15 shows a side view of an articulated loader boom according to an embodiment of the present invention.
Figure 16:
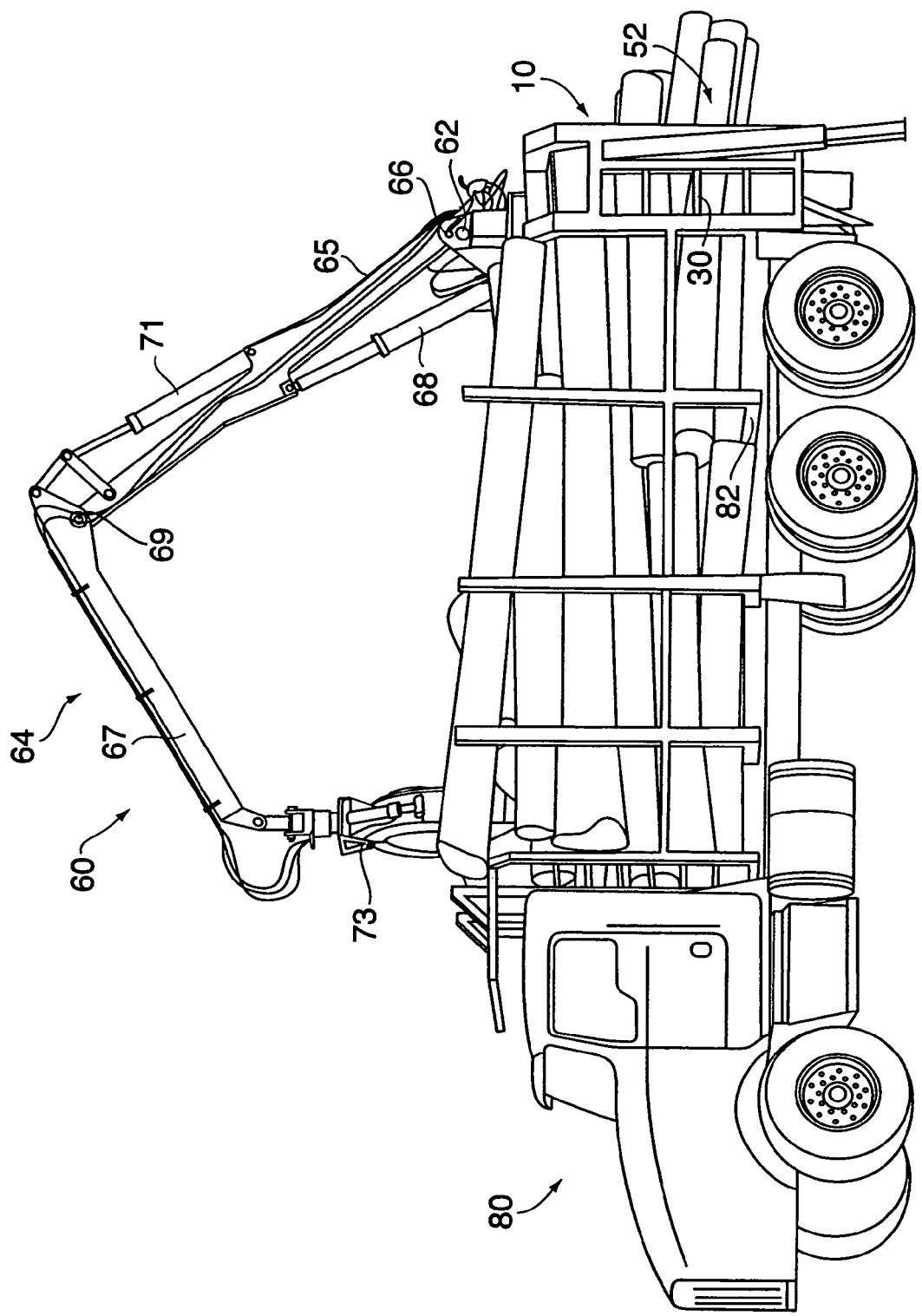
FIG. 16 shows a loader vehicle equipped with a loader having an articulated boom according to an embodiment of the present invention.

Boom 64 is pivotally mounted to rotatable mount 62 via a first pivot 66. Boom 64 is preferably articulated (as shown in FIGS. 15 and 16) and comprises at least a first boom arm 65 and a second boom arm 67. Second boom arm 67 is pivotally mounted to first boom arm 65 by a second pivot 69. Articulated motion is applied to first boom arm 65 and second boom arm 67 by first and second actuators 68 and 71. First and second actuators 68 and 71 can be employed individually or in combination and are attached to boom 64 such that first actuator 68 imparts a pivotal motion to first and second boom arms 65 and 67 about first pivot 66 and second actuator 71 imparts a pivotal motion to second boom arm 67 about second pivot 69. A claw 73 or other mechanism for engaging a load known to those skilled in the art is preferably attached to second boom arm 67.

Figure 11:
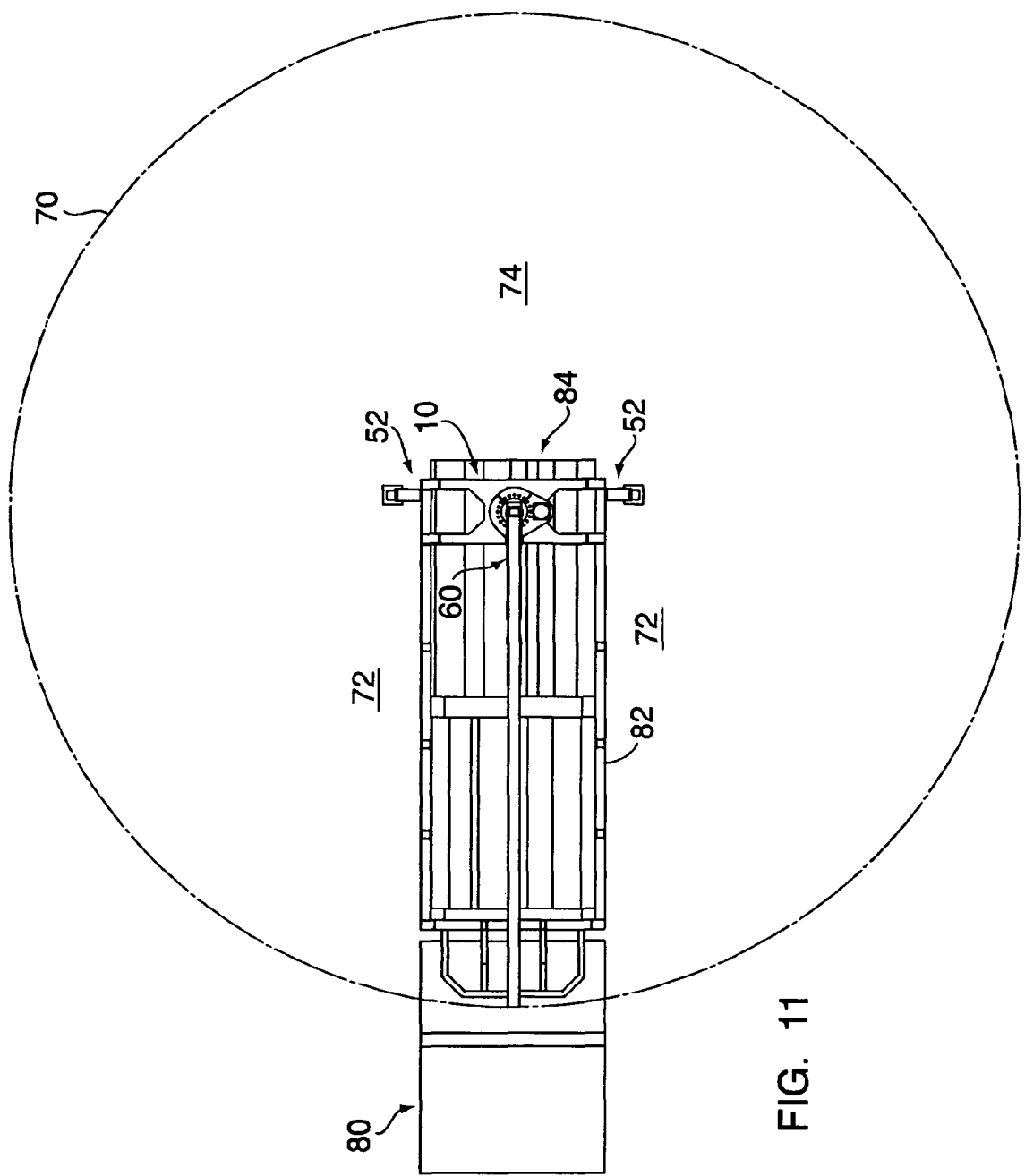
FIG. 11 shows a top view of a loader vehicle equipped with a loader frame assembly according to an embodiment of the present invention.

Referring to FIG. 11, it can be seen that a loader 60, mounted to loader frame assembly 10 (loader frame assembly 10 being connected to vehicle 80), encompasses a circular work area 70. Work area 70 includes vehicle bed 82, areas 72 adjacent to each side of vehicle bed 82, and area 74 behind vehicle bed 82. Loader 60 can engage a load anywhere within working area 70.

It can be appreciated from the description of the previous embodiments that a loader vehicle 80 equipped with a loader frame assembly 10 according to the present invention, while enjoying the payload capacity of a cab-mounted loader 180 (and superior to that of rear-mounted loader 280), enjoys a work area like work area 270 of rear-mounted loader 280.

Because a load 84 can extend through loader frame assembly 10 (as shown in FIGS. 3 and 4), a loader vehicle 80 equipped with a loader frame assembly 10 according to an embodiment of the present invention enjoys superior configuration flexibility. Some embodiments of loader vehicle configurations according to the present invention are shown and described in FIGS. 12-14.

Figure 12:
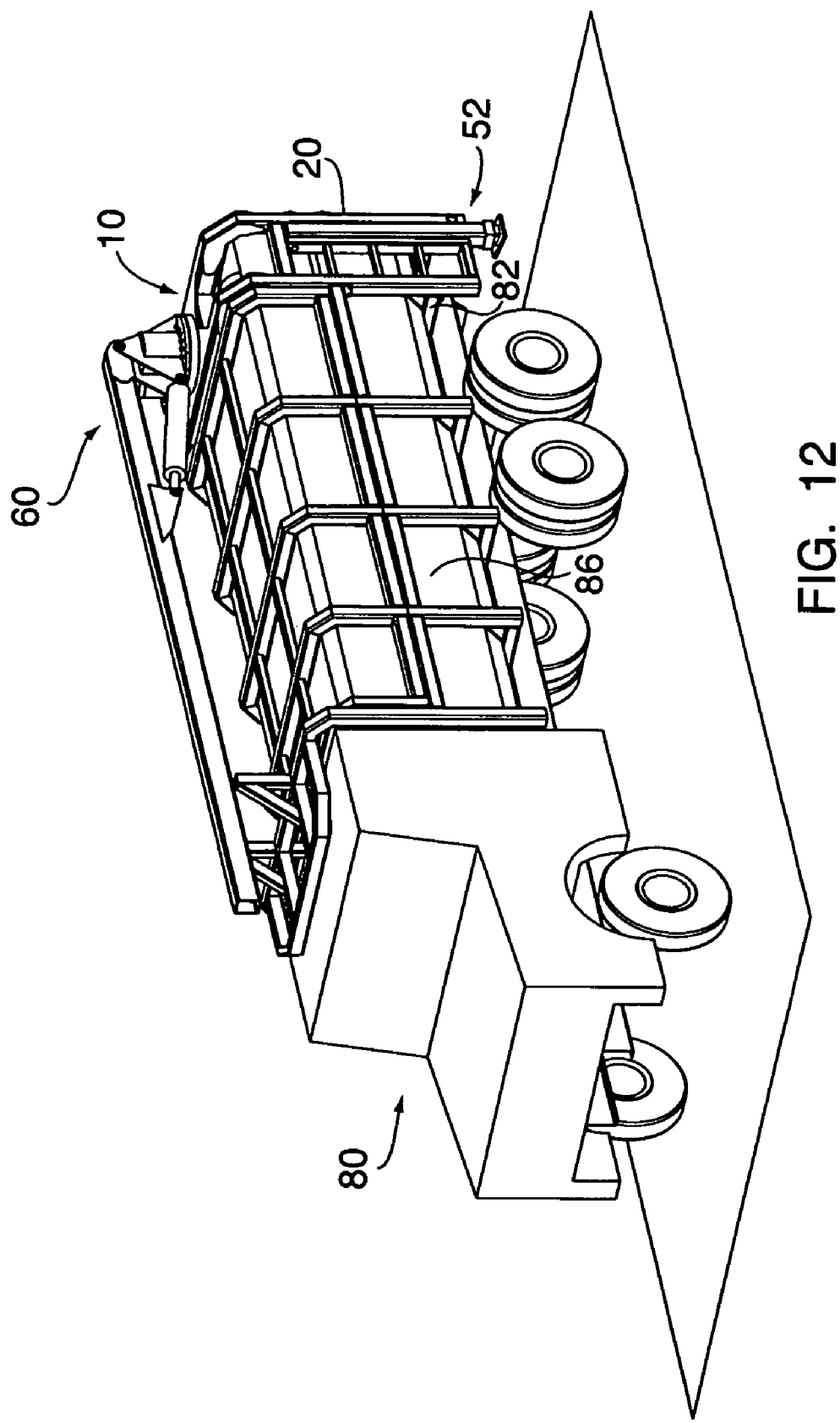
FIGS. 12-14 show loader vehicle configurations for a loader vehicle equipped with a loader frame assembly according to embodiments of the present invention.

In FIG. 12, a loader vehicle 80 is shown equipped with a loader frame assembly 10 having open area 20. The loader frame assembly is connected to a rear portion of vehicle bed 82. Vehicle bed 82 is configured with a closed compartment 86. Closed compartment 86, in this embodiment, accommodates a load (not shown), including a particulate load, through open area 20 of loader frame assembly 10. In a variation of this embodiment (not shown), vehicle bed 82 is provided with a closed compartment 86 and an open compartment.

Figure 13:
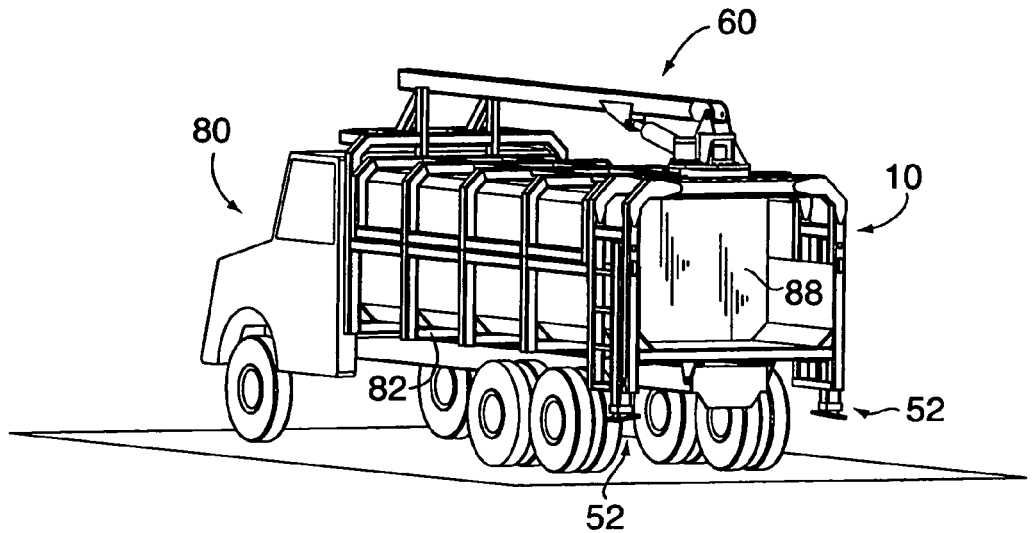

Referring to FIG. 13, a loader vehicle 80 configuration is shown having a pusher plate 88 slidably mounted, preferably to vehicle bed 82. Upon rearward actuation of pusher plate 88, a load (not shown) is engaged and impelled rearward through loader frame assembly 10.

Figure 14:
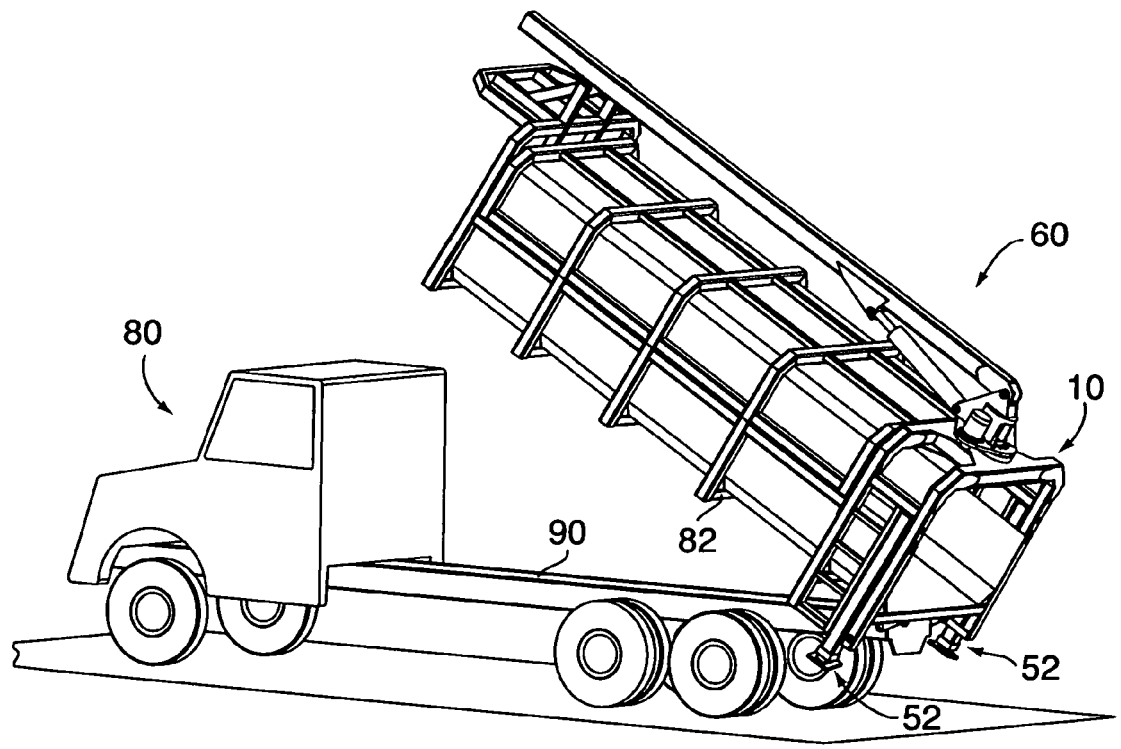

Referring to FIG. 14, a loader vehicle 80 configuration is shown where a rear portion of vehicle bed 82 is rotatably mounted to a rear portion of vehicle frame 90. Vehicle bed 82 is inclined in a dumping position such that a load (not shown) is dumped through vehicle frame assembly 10.

In a further loader vehicle configuration (not shown), a loader vehicle is equipped with a towed chipper. The loader can engage a load, preferably a log, and supply the load to the towed chipper. Typically, the log engaged by the loader is located on the ground within the loader working area. The towed chipper processes the log into a particulate load, preferably wood chips, and discharges the load. A closed compartment (as in FIG. 12) is equipped to receive and store a particulate load, which is later emptied using pushing functionality (as in FIG. 13), dumping functionality (as in FIG. 14), a live/conveyor floor (not shown), manual removal, or other removal means known to those skilled in the art.

It can be appreciated that conventional rear-mounted loaders could not as effectively accommodate vehicle configurations with dosed compartments, pushing functionality, dumping functionality, or towed chippers. Rear-mounted loader 280 could not accommodate a load through loading apparatus 210, and so could not enjoy the benefit of such configurations. Conventional cab-mounted loaders would also limit the effectiveness of such configurations since working area 170 of cab-mounted loader 180 did not permit loader 160 to engage loads behind bed 182, thus limiting the utility of any rear open area or towed chipper.

Those skilled in the art will appreciate that the present invention is not limited to the embodiments described, but that various modifications and alterations are possible within the scope of the current invention, and that many of the features of the current invention can be employed in various combinations or separately, all without departing from the scope of the current invention.

What is claimed is:

1. A loader frame assembly comprising:
    a support member adapted to mount a loader thereto;
    first and second legs extending from the support member, each having an end, the ends adapted for connection to a vehicle; and
    an extendable stabilizer mounted to one of the first and second legs for engaging a support surface during a loading process;
    wherein the first and second legs are substantially parallel to each other and are spaced apart such that the first and second legs partially define an open area, the open area increasing a payload capacity and a configuration flexibility of a vehicle by allowing a load to extend through the loader frame assembly.

2. The loader frame assembly of claim 1, wherein the extendable stabilizer is rotatably mounted to one of the first and second legs for increasing an effective footprint of a vehicle during a loading process.

3. The loader frame assembly of claim 1, wherein the first and second leg ends are adapted for connection to a vehicle bed such that a portion of a vehicle bed between the first and second leg ends further defines the open area.

4. The loader frame assembly of claim 3, wherein the first and second leg ends are adapted for connection to a vehicle bed rear portion, such that a loader rotatably mounted to the support member encompasses a working area including the vehicle bed, the area adjacent to each of two sides of the vehicle bed, and the area behind the vehicle bed, allowing the loader to engage a load anywhere within the working area.

5. The loader frame assembly of claim 3, wherein the first and second leg ends are adapted for connection to a vehicle bed rear portion, such that the loader frame assembly is operatively functional with a vehicle bed equipped with one of rearward dumping functionality and rearward pushing functionality.

6. The loader frame assembly of claim 1, wherein one of the first and second legs includes a ladder, the ladder facilitating access to the support member.

7. A loader assembly for vehicular mounting, the loader assembly comprising:
    a loader frame assembly having a support member and first and second legs, the first and second legs extending from the support member, each having an end, the ends adapted for connection to a vehicle;
    a loader mounted to the support member; and
    an extendable stabilizer mounted to one of the first and second legs for engaging a support surface during a loading process;
    wherein the first and second legs are substantially parallel to each other and are spaced apart such that the first and second legs and the support member partially define an open area, the open area increasing a payload capacity and a configuration flexibility of a vehicle by allowing a load to extend through the loader frame assembly.

8. The loader assembly of claim 7 wherein the loader is rotatably mounted to the support member.

9. The loader frame assembly of claim 1, wherein the first and second leg ends are adapted for connection to a vehicle bed such that the portion of a vehicle bed between the first and second leg ends further defines the open area.

10. The loader frame assembly of claim 9, wherein the loader is rotatably mounted to the support member, and the first and second leg ends are adapted for connection to a vehicle bed rear portion such that the loader encompasses a working area including the vehicle bed, the area adjacent to each of two legs of the vehicle bed, and the area behind the vehicle bed, allowing the loader to engage a load anywhere within the working area.

* * * * *